US012567238B2

(12) United States Patent
Gladisch et al.

(10) Patent No.: US 12,567,238 B2
(45) **Date of Patent: *Mar. 3, 2026**

(54) GENERATING A DATA STRUCTURE FOR SPECIFYING VISUAL DATA SETS

(71) Applicant: Robert Bosch GmbH, Stuttgart (DE)

(72) Inventors: Christoph Gladisch, Renningen (DE); Christian Heinzemann, Ludwigsburg (DE); Martin Herrmann, Korntal (DE); Matthias Woehrle, Bietigheim-Bissingen (DE); Nadja Schalm, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1034 days.

This patent is subject to a terminal disclaimer.

(21) Appl. No.: 17/646,958

(22) Filed: Jan. 4, 2022

(65) Prior Publication Data

US 2022/0230072 A1    Jul. 21, 2022

(30) Foreign Application Priority Data

Jan. 15, 2021    (DE) ..................... 10 2021 200 347.8

(51) Int. Cl.
*G06V 10/00* (2022.01)
*G06V 10/58* (2022.01)
*G06V 10/771* (2022.01)
*G06V 10/774* (2022.01)
*G06V 10/776* (2022.01)
(Continued)

(52) U.S. Cl.
CPC ............ *G06V 10/771* (2022.01); *G06V 10/58* (2022.01); *G06V 10/774* (2022.01); *G06V 10/776* (2022.01); *G06V 10/7796* (2022.01); *G06V 10/82* (2022.01)

(58) Field of Classification Search
CPC ............ G06N 3/08; G06N 3/02; G06N 3/042; G06N 3/045; G06N 3/047; G06N 3/082; G06N 3/092; G06N 3/0475; G06N 3/0454; G06N 3/0464; G06N 20/00; G06N 20/10; G06V 10/82; G06V 10/771; G06V 10/776; G06V 10/774; G06V 10/7796; G06V 10/58; G06V 20/56; G06F 18/214; G06F 18/23
See application file for complete search history.

(56) References Cited

U.S. PATENT DOCUMENTS

| 11,716,300 B2 * | 8/2023 | Ravine | ..................... H04L 51/10 |
| | | | 709/206 |
| 11,908,178 B2 * | 2/2024 | Gladisch | .............. G06V 10/762 |

(Continued)

OTHER PUBLICATIONS

Bargoti and Underwood: "Utiising Metadata to Aid Image Classification in Orchards", IEEE International Conference on Intelligent Robots and Systems (IROS), Workshop on Alternative Sensing for Robot Perception (WASROP), (2015), pp. 1-3.

(Continued)

*Primary Examiner* — Amir Alavi
(74) *Attorney, Agent, or Firm* — NORTON ROSE FULBRIGHT US LLP

(57) ABSTRACT

Facilitating the description or configuration of a computer vision model by generating a data structure comprising a plurality of language entities defining a semantic mapping of visual parameters to a visual parameter space based on a sensitivity analysis of the computer vision model.

18 Claims, 7 Drawing Sheets

(51) Int. Cl.
 *G06V 10/778* (2022.01)
 *G06V 10/82* (2022.01)

(56) References Cited

U.S. PATENT DOCUMENTS

| | | | | |
|---|---|---|---|---|
| 12,192,600 | B2 * | 1/2025 | Mazaheri | H04N 21/8549 |
| 12,198,275 | B2 * | 1/2025 | Bautista Martin | G06T 17/00 |
| 12,223,696 | B2 * | 2/2025 | Gladisch | G06V 10/761 |
| 12,283,119 | B2 * | 4/2025 | Vineet | G06V 20/58 |
| 2006/0262959 | A1 * | 11/2006 | Tuzel | G06V 20/40 |
| | | | | 382/103 |
| 2022/0222926 | A1 * | 7/2022 | Gladisch | G06V 10/764 |
| 2022/0230418 | A1 * | 7/2022 | Gladisch | G06V 10/82 |
| 2022/0237897 | A1 * | 7/2022 | Heinzemann | G06T 7/35 |
| 2022/0414928 | A1 * | 12/2022 | Venkataraman | G06V 10/145 |

OTHER PUBLICATIONS

Engelbrecht, et al.: "Determining the Significance of Input Parameters Using Sensitivity Analysis", International Workshop on Artificial Neural Networks, Springer, Berlin, Heidelberg, (1995), pp. 382-388.

Teodoro, et al.: "Algorithm sensitivity analysis and parameter tuning for tissue image segmentation pipelines", Bioimage informatics, Bioinformatics 33(7), (2017), pp. 1064-1072.

Dosovitskiy, Alexey et al. "Carla: An Open Urban Driving Simulator" 1st Conference on Robot Learning (CoRL 2017) Mountain View, United States. Nov. 10, 2017. arXiv:1711.03938v1. Retreived from the Internet on Dec. 29, 2021: https://arxiv.org/pdf/1711.03938.pdf. 16 Pages.

* cited by examiner

1

GENERATING A DATA STRUCTURE FOR SPECIFYING VISUAL DATA SETS

CROSS REFERENCE

The present application claims the benefit under 35 U.S.C. § 119 of German Patent Application No. DE 102021200347.8 filed on Jan. 15, 2021, which is expressly incorporated herein by reference in its entirety.

FIELD

This present invention relates a computer-implemented method for generating a data structure comprising a plurality of language entities defining a semantic mapping of visual parameters to a visual parameter space. Associated aspects of the present invention concern a computer-implemented method for training a computer vision model, an apparatus, a computer program, and a computer readable medium.

BACKGROUND INFORMATION

Computer vision concerns how computers can automatically gain high-level understanding from digital images or videos. Computer vision systems are finding increasing application to the automotive or robotic vehicle field. Computer vision can process inputs from any interaction between at least one detector and the environment of that detector. The environment may be perceived by the at least one detector as a scene or a succession of scenes. In particular, interaction may result from at least one camera, a multi-camera system, a RADAR system or a LIDAR system.

In automotive computer vision systems, computer vision often has to deal with open context, despite remaining safety-critical. It is, therefore, important that quantitative safeguarding means are taken into account both in designing and testing computer vision models. The development and testing of computer vision models may, thus, be further improved.

SUMMARY

According to a first aspect of the present invention, there is provided a computer-implemented method for generating a data structure comprising a plurality of language entities defining a semantic mapping of visual parameters to a visual parameter space. In accordance with an example embodiment of the present invention, the method includes:

obtaining a computer vision model configured to perform a computer vision function of characterizing elements of observed scenes;

obtaining a first visual parameter set comprising a plurality of initial visual parameters, wherein an item of visual data provided based on the extent of the at least one initial visual parameter is capable of affecting a classification or regression performance of the computer vision model;

providing a visual data set comprising a subset of items of visual data compliant with the first visual parameter set, and a corresponding subset of items of groundtruth data;

applying the subset of items of visual data to the computer vision model to obtain a plurality of performance scores characterizing the performance of the computer vision model when applied to the subset of items of visual data of the visual data set, using the corresponding groundtruth data;

performing a sensitivity analysis of the plurality of performance scores over a domain of the first visual parameter set;

generating a second visual parameter set comprising at least one updated visual parameter, wherein the second visual parameter set comprises at least one initial visual parameter modified based on the outcome of the sensitivity analysis to provide the at least one updated visual parameter;

generating a data structure comprising at least one language entity based on the visual parameters of the second visual parameter set, thus providing a semantic mapping to visual parameters of the second visual parameter set.

The method according to the first aspect of the present invention advantageously enables the automatic definition of a refined visual parameter set (or specification) that has been automatically improved to contain one or more visual parameter sets that are tuned to the performance of the targeted computer vision model. Such refined visual parameters form language entities of a specification language.

A specification language is important for various tasks such as acquiring images (single images or sequences) from an image vendor/provider (e.g. a 3D rendering studio, or physical image capture in the field), for specifying product requirements of a computer vision model in the development, for testing and verification activities of the computer vision model, for providing a safety specification of a product (the operational design domain), and for enabling collaborations by a common exchange format. Designing a specification language is difficult for human experts, because opinions on the relevant aspects of an image may vary and an image can be described in many ways on a higher level.

The specification language helps to develop, and empirically justify, the design of an image specification language. The approach is to represent the language components using visual parameters which constitute the taxonomy of the language. The importance of the language components is prioritized, this prioritization can be used to build subsets and reduce the complexity of the language.

Another result is an operationalization or concretization of the visual parameters in terms of a semantic mapping from refined visual parameters to items of visual data and corresponding predictions. This way ambiguous interpretations of the visual parameters can be resolved. This is relevant for the developing and training the computer vision model. It can also be important for testing the computer vision model and in case of liability.

The language is a data structure that can be stored in an exchange format. This enables collaboration between data-providers and developers and testers of AI-based computer vision model. Using one language is also useful to test and compare different computer vision models on equal terms. Similarly, different operational design domains defined in terms of a common specification language can be compared.

In an example, the visual parameter set may be refined to comprise visual parameters that cause the computer vision model to have a large variance. Further images chosen as training data using such a visual parameter set may be useful for training a computer vision model, because the higher variance implies that the images chosen according to such a visual parameter set contain a large number of "corner cases" that the computer vision model should be trained to respond to safely. In other words, the method may select a subset of the visual parameter set (and value ranges) which affect highest variance of performance. A data structure generated from such a visual parameter set enables better selection or definition of visual states of a scene that a computer vision model performs poorly on. A language defined by such a data structure way may be used to define corner cases during verification, for example.

In an example, the visual parameter set may be refined to comprise visual parameters that cause the computer vision model to have a small variance. Further visual states of a scene defined using such a visual parameter set may be useful for verifying a computer vision model, because the lower variance implies that the images chosen according to such a visual parameter set contain steady-state cases that the computer vision model should be able to perform reliably on. A data structure generated from such a visual parameter set enables better selection or definition of visual states of a scene that a computer vision model performs well on. A language defined by such a data structure way may be used to define stable-state cases during verification, for example.

In either case, reducing one or more redundant parameters in a visual parameter set equates to a significant reduction in the size of a parameter space when training or verifying a computer vision model, enabling a faster and more energy efficient training and/or verification process.

Visual parameters are any aspect of an image or video that affect the comprehension of a displayed scene by a computer vision model. As one example, a visual parameter might be the angle of the sun with respect to an ego-vehicle, a time of day, the height and proximity of buildings and trees in the scene, the speed of the ego-vehicle, the speed and location of vehicles relative to the ego-vehicle, the visual character- istics of a road surface in front of the ego vehicle, and the like.

As a concrete example, a wet road surface with the sun directly ahead of the ego-vehicle might result in additional glare being directed towards the windscreen of the ego vehicle. This condition could affect how accurately a com- puter vision model could classify road signs located forward of the ego vehicle, owing to increased glare. Accordingly, a road sign identification task of a computer vision model would, in the described condition, be more likely to mis- identify road signs. Therefore, the performance of the com- puter vision model would show a higher result variance. In this example wetness of the road and sun angle directly ahead of the ego-vehicle can be promoted to language entities of the specification language.

During the training of computer vision models, control over the training data set enables the computer vision model to be trained to address difficult conditions. An operational design domain (ODD) is defined that describes the range of visual parameters that the training data should encompass. Typically, the definition of the operational design domain is a highly manual task requiring the input of domain experts. According to the present specification, domain experts may provide an initial operational design domain, "first visual parameter set", or "first visual parameter specification". In an example, the semantic mapping defined by the plurality of language entities generated according to the present specification may be used to define points, value ranges, or clusters within the ODD.

The present invention provides an approach that auto- matically analyses the performance of a computer vision model to training data using the initial operational design domain, and automatically provides a second operational design domain, or "second visual parameter set" having improved visual parameters through iterative refinement. The second visual parameter set is provided based on a sensitivity analysis of the performance of the computer vision model on a test training set chosen in accordance with an initial set of visual parameters.

In other words, if the initial set of visual parameters caused the computer vision model to underperform, such parameters may be de-emphasized, narrowed in scope, or removed in the second visual parameter set. In particular, visual parameters may be prioritized, and a sub-range of the initial visual parameters defined as a safe operating region of the computer vision model. In some cases, a visual param- eter can be split into several sub parameters.

A safe operating region is one in which the performance of the computer vision model when identifying elements in a scene of the training data is relatively insensitive to variations in the given visual parameter.

In general, the approach in accordance with the present invention enables the automatic generation of an operational design domain using a repeatable automatic process that enables ambiguous interpretations of visual parameters to be resolved. Therefore, one or more visual parameter sets generated according to the method of the first aspect can serve as an empirically validated test case for a computer vision model. The methodology enforces decision making based on empirical results.

In other words, the first aspect of the present invention analyses which visual parameters have the biggest impact when testing or statistically evaluating a computer vision model. Given a set of visual parameters and a computer vision model as input, a sorted list of visual parameters are output. By selecting a sub-list of visual parameters from a sorted list, a reduced input model (ontology) of the second visual parameter set is defined.

Once applied to a computer vision model providing input to the control system of an autonomous vehicle, robot, or drone, a computer vision model trained according to the present specification will perform more reliably, leading to an improvement in safety of the autonomous vehicle, robot, or drone.

In an example embodiment of the present invention, the semantic mapping is capable of constraining a training data set for training a computer vision model.

In an example embodiment of the present invention, the semantic mapping is capable of defining, selecting, or con- straining the operation of a computer vision model.

In an example embodiment of the present invention, the semantic mapping is capable of defining, a point within the operational design domain of a computer vision model.

In an example embodiment of the present invention, the semantic mapping is capable of defining a verification case of a computer vision model.

In an example embodiment of the present invention, the semantic mapping is a visual parameter specification lan- guage.

A second aspect of the present invention provides a computer-implemented method for training a computer vision model. In accordance with an example embodiment of the present invention, the method includes:

obtaining a further computer vision model configured to perform a computer vision function of characterising elements of observed scenes; and obtaining a set of training data according to the method of the first aspect, or its embodiments.

training the computer vision model using the set of training data.

Advantageously, a more predictably trained computer vision model can be provided.

A third aspect of the present invention provides an apparatus for generating a data structure comprising a plurality of language entities defining a semantic mapping of visual parameters to a visual parameter space. In accordance with an example embodiment of the present invention, the apparatus includes:

an input interface;
a processor;
a memory; and
an output interface.

The input interface is configured to obtain a computer vision model configured to perform a computer vision function of characterizing elements of observed scenes, and to obtain a first visual parameter set comprising a plurality of initial visual parameters, wherein an item of visual data provided based on the extent of the at least one initial visual parameter is capable of affecting a classification or regression performance of the computer vision model, and The processor is configured to providing a visual data set comprising a subset of items of visual data compliant with the first visual parameter set, and a corresponding subset of items of groundtruth data, and to apply the subset of items of visual data to the computer vision model to obtain a plurality of performance scores characterizing the performance of the computer vision model when applied to the subset of items of visual data of the visual data set, using the corresponding groundtruth data, and to perform a sensitivity analysis of the plurality of performance scores over a domain of the first visual parameter set, and to generate a second visual parameter set comprising at least one updated visual parameter, wherein the second visual parameter set comprises at least one initial visual parameter modified based on the outcome of the sensitivity analysis to provide the at least one updated visual parameter, and to generate a data structure comprising at least one language entity based on the visual parameters of the second visual parameter set, thus providing a semantic mapping to visual parameters of the second visual parameter set.

A fourth aspect of the present invention provides computer program comprising machine-readable instructions which, when executed by a processor, is capable of carrying out either (i) the computer-implemented method according to the method of the first aspect, or its embodiments, and/or (ii) the computer-implemented method according to the method of the second aspect.

A fifth aspect of the present invention provides a computer readable medium comprising at least one of the computer programs according to the fourth aspect, and/or the data structure comprising the at least one language entity and/or the semantic mapping generated according to the method of the first aspect, or its embodiments.

Example embodiments of the aforementioned aspects disclosed herein and explained in the following description, to which the reader should now refer.

The present definitions have general applicability to this specification.

A visual data set of the observed scenes is a set of items representing either an image such as JPEG or GIF images, or a video. A video is a sequence of images, optionally encoded as necessary in a format such as MPEG.

A computer vision model is a function parametrized by model parameters. The model parameters are learned during training based on the training data set using machine learning techniques. The computer vision model is configured to at least map an item of visual data or a portion, or subset thereof to an item of predicted groundtruth data. One or more visual parameters define a visual state in that they contain information about the contents of the observed scene and/or represent boundary conditions for capturing and/or generating the observed scene. A latent representation of the computer vision model is an intermediate (i.e. hidden) layer or a portion thereof in the computer vision model.

An item of groundtruth data corresponding to one item of visual data is a classification and/or regression result that the computer vision model is intended to output in response to an image input, when performing correctly. In other words, the groundtruth data represents a correct, answer that the computer vision model should, in an ideal case, output when an item of visual data showing a predictable scene or element of a scene is input. The term image may relate to a subset of an image, such as a segmented road sign or obstacle.

A visual data set of the observed scenes is a set of items representing either an image or a video, the latter being a sequence of images. Each item of visual data can be a numeric tensor with a video having an extra dimension for the succession of frames. An item of groundtruth data corresponding to one item of visual data is, for example a classification and/or regression result that the computer vision model should output in ideal conditions. For example, if the item of visual data is parameterized in part according to the presence of a wet road surface, and the presence, or not of a wet road surface is an intended output of the computer model to be trained, the groundtruth would return a description of that item of the associated item of visual data as comprising an image of a wet road.

Each item of groundtruth data can be another numeric tensor, or in a simpler case a binary result vector, associated with or referenced to an item in the visual data set. The groundtruth data provides a definitive result concerning an element of a scene in its associated visual data. For example, an item of visual data comprising an image of a 20 km/h speed limit sign would be associated with a result vector confirming that the scene contains a road sign, with further levels of detail being that the road sign is a speed limit sign, that the displayed speed limit is 20 km/h. In this way, the output prediction of a computer vision model applied to the item of visual data can be assessed for correctness by comparison to the associated groundtruth data, and a performance measure of the computer vision model calculated.

Exemplary embodiments of the present invention are depicted in the figures, which are not to be construed as limiting the present invention, and are explained in greater detail below.

DETAILED DESCRIPTION OF EXAMPLE EMBODIMENTS

Figure 1:
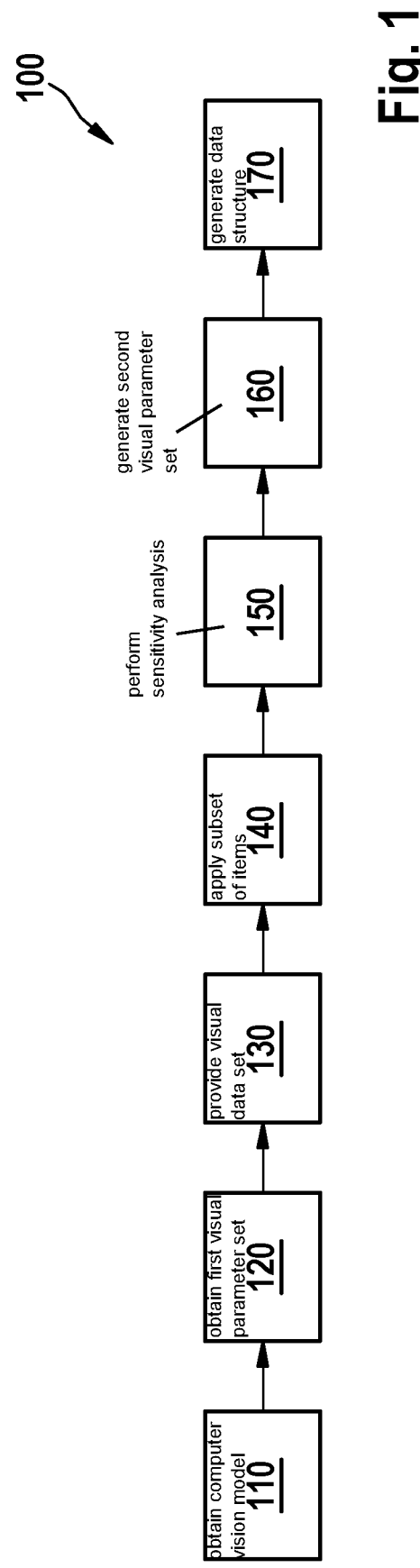
FIG. 1 schematically illustrates an example computer-implemented method according to the first aspect of the present invention.

One or more visual parameters define a visual state of a scene because it or they contain information about the contents of the observed scene and/or represent boundary conditions for capturing and/or generating the observed scene. A typical scene is characterized by a large number of visual parameters, some of which are continuous variables. Therefore, the search space for computing functions over the total number of visual parameters characterizing a typical scene is onerous.

The visual parameters can be for example: camera properties (e.g. spatial- and temporal-sampling, distortion, aberration, color depth, saturation, noise etc.), LIDAR or RADAR properties (e.g., absorption or reflectivity of surfaces, etc.), light conditions in the scene (light bounces, reflections, light sources, fog and light scattering, overall illumination, etc.), materials and textures, objects and their position, size, and rotation, geometry (of objects and environment), parameters defining the environment, environmental characteristics like seeing distance, precipitation-characteristics, radiation intensities (which are suspected to strongly interact with the detection process and may show strong correlations with performance), image characteristics/statistics (such as contrast, saturation, noise, etc.), domain-specific descriptions of the scene and situation (e.g. cars and objects on a crossing), etc. Many more parameters are possible.

These parameters can be seen as an ontology, taxonomy, dimensions, or language entities. They can define a restricted view on the world or an input model. A set of concrete images can be captured or rendered given an assignment/a selection of visual parameters, or images in an already existing dataset can be described using the visual parameters. The advantage of using an ontology or an input model is that for testing an expected test coverage target can be defined in order to define a test end-criterion, for example using t-wise coverage, and for statistical analysis a distribution with respect to these parameters can be defined. Language entities are the building blocks of a specification language.

Images, videos, and other visual data along with co-annotated other sensor data (GPS-data, radiometric data, local meteorological characteristics) can be obtained in different ways. Real images or videos may be captured by an image capturing device such as a camera system. Real images may already exist in a database and a manual or automatic selection of a subset of images can be done given visual parameters and/or other sensor data. Visual parameters and/or other sensor data may also be used to define required experiments. Another approach can be to synthesize images given visual parameters and/or other sensor data. Images can be synthesized using image augmentation techniques, deep learning networks (e.g. Generative Adversarial Networks (GANs), Variational Autoencoders (VAEs)), and 3D rendering techniques. A tool for 3D rendering in the context of driving simulation is for example the CARLA tool (Koltun, 2017, available at www.arXiv.org: 1711.03938).

Conventionally, in development and testing of computer vision models, the input images are defined, selected, or generated based on properties (visual parameters) that seem important according to expert opinion. However, the expert opinion relating to the correct choice of visual parameters may be incomplete, or mislead by assumptions caused by the experience of human perception. Human perception is based on the human perception system (human eye and visual cortex), which differs from the technical characteristics of detection and perception using a computer vision model.

Conventionally, if existing, language entities of a specification language are defined a priori based on expert opinion. Again, the specification language may be incomplete or misleading as it does not take relevance of visual parameters into account.

Conventionally, the computer vision model may be developed or tested on image properties which are not relevant, and visual parameters which are important influence factors may be missed or underestimated. Furthermore, a technical system can detect additional characteristics as polarization, or extended spectral ranges that are not perceivable by the human perception system.

A computer vision model for an autonomous system is a safety-critical component. To ensure safety, and for liability reasons, the definition of a visual parameter set (sometimes termed an operational design domain) integrates with a computer vision model to provide a safety guarantee. Defining the interaction of the computer vision model with its training data is complex.

FIG. 1 schematically illustrates a computer-implemented method according to the first aspect.

The first aspect provides a computer-implemented method 100 for generating a data structure comprising a plurality of language entities defining a semantic mapping of visual parameters to a visual parameter space, wherein the method comprises:

obtaining 110 a computer vision model configured to perform a computer vision function of characterizing elements of observed scenes;

obtaining 120 a first visual parameter set comprising a plurality of initial visual parameters, wherein an item of visual data provided based on the extent of the at least one initial visual parameter is capable of affecting a classification or regression performance of the computer vision model;

providing 130 a visual data set comprising a subset of items of visual data compliant with the first visual parameter set, and a corresponding subset of items of groundtruth data;

applying 140 the subset of items of visual data to the computer vision model to obtain a plurality of performance scores characterizing the performance of the computer vision model when applied to the subset of items of visual data of the visual data set, using the corresponding groundtruth data;

performing 150 a sensitivity analysis of the plurality of performance scores over a domain of the first visual parameter set;

generating 160 a second visual parameter set comprising at least one updated visual parameter, wherein the second visual parameter set comprises at least one initial visual parameter modified based on the outcome of the sensitivity analysis to provide the at least one updated visual parameter;

generating 170 a data structure comprising at least one language entity based on the visual parameters of the second visual parameter set, thus providing a semantic mapping to visual parameters of the second visual parameter set.

The computer vision model 16 is, for example, a deep neural network (DNN) or a neural-network-like model, each comprising a plurality of neural net layers. However, other model topologies conventional to a skilled person may also be implemented according to the present technique. The layers compute latent representations which are higher-level representation of the input image or video sequence. The computer vision model 16 may be in a pre-trained state. Machine learning often involves iterations of training steps.

The first visual parameter set is, for example, a data structure defining different types of visual phenomena that can affect the performance of a computer vision model performing a function such as, for example, image or video recognition, classification, or regression on a scene, or a portion of the scene. The visual phenomena are encoded by one or more visual parameter sets. For example, a visual parameter set may define parameters 60 as a series of discrete values, such as precipitation intensity (see e.g. FIG. 5C). A visual parameter set may define parameters using Boolean conditions, such as a Boolean condition defining the presence or absence of tree cover. Alternatively or in addition, a visual parameter set may define parameters using continuous ranges, such as azimuth angle displacements.

Sampling a set of values within the boundaries defined by a visual parameter set enables items of visual data and items of corresponding groundtruth data to be provided that are compliant with the visual parameter set. As an example, visual parameters are compliant to items of visual data and items of corresponding groundtruth data, if items of visual data and items of corresponding groundtruth data are generated by a synthetic image generator, captured by a physical capturing device, and/or selected from a database, each according to the visual parameters.

The visual parameter set may be considered to represent an ontology, taxonomy, dimensions, or language entities defining a restricted view on the world, or an input model. A set of concrete images can be captured (from a real image dataset) or rendered (using a synthetic image generation engine) using the visual parameters.

Updating at least one visual parameter may comprise one or a combination of adding, removing, redefining, splitting, merging or combining visual parameters. It may also comprise coordinate transformations of visual parameters. Updating at least one visual parameter based on the outcome of the sensitivity analysis can be aimed at increasing the relevance of the visual parameters.

In an embodiment, the visual parameters of the first or second visual parameter set may comprise one or any combination selected from the following list: one or more parameters describing a configuration of an image capture arrangement, optionally an image or video capturing device, visual data is taken in or synthetically generated for, optionally, spatial and/or temporal sampling, distortion aberration, colour depth, saturation, noise, absorption, reflectivity of surfaces, one or more light conditions in a scene of an image/video, light bounces, reflections, light sources, fog and light scattering, overall illumination; and/or one or more features of the scene of an image/video, optionally, one or more objects and/or their position, size, rotation, geometry, materials, textures, one or more parameters of an environment of the image/video capturing device or for a simulative capturing device of a synthetic image generator, optionally, environmental characteristics, seeing distance, precipitation characteristics, radiation intensity, image characterizing statistics such as contrast, saturation, noise, or one or more domain-specific descriptions of the scene of an image/video, optionally, one or more cars or road users, or one or more objects on a crossing.

In an embodiment, the domain of the first visual parameter set comprises a subset, in a finite-dimensional vector space, of numerical representations that visual parameters are allowed to lie in, optionally a multi-dimensional interval of continuous or discrete visual parameters, or a set of numerical representations of visual parameters in the finite-dimensional vector space. In particular, a visual parameter can be a set of discrete (e.g. points) or continuous values (e.g. range, interval). Values can also be Boolean.

Box 1 is a practical example of a visual parameter set. Each of the bracketed text strings such as "spawn_point", "cam_yaw" are examples of an initial visual parameter set. In the example of box 1, the values of the initial visual parameter set are a series of discrete values, although alternatively at least one of the visual parameter set may comprise a range between at least two endpoints. Alternatively, at least one visual parameter set of the visual parameter set may comprise a plurality of ranges (not illustrated in Box 1).

---

Box 1-example of a first visual parameter set in "Python"

```
worldmodel = OrderedDict ([ ('spawn_point', [0,3,6,9,12,15]),
    ('cam_yaw', [-20, -10, 0, 10, 20]),
    ('cam_pitch', [-10, -5, 0, 5, 10]),
    ('cam_roll' , [-10, -5, 0, 5, 10]),
    ('cloudyness', [0, 33, 66, 100]),
    ('precipitation', [0, 50, 100]),
    ('precipitation_deposits', [0, 50, 100]),
    ('sun_altitude_angle', [-10, 0, 33, 66, 100]),
    ('sun_azimuth_angle', [0, 45, 90, 135, 180, 225, 270]),
    ])
```

---

Images for training a computer vision model 16 are obtained based on the second visual parameter set. In order for the computer vision model 16 to provide a predictable characterisation of elements in a real scene, it should be trained on representative data. Typically, the visual parameter set of Box 1 is defined according to the opinion of an expert. However, the expert may have an incorrect opinion, or be biased. In this case, a computer vision model could be trained on biased training data.

According to the present specification, an updated or second visual parameter set based on the first visual parameter set is generated following an optimization process. The first visual parameter set is automatically modified based on the outcome of the sensitivity analysis according to the computer implemented method of the first aspect to ensure that, visual data is obtained that is compliant with the definition of the second visual parameter set, causes a large variance in performance score when applied to the computer vision model 16. This enables the second visual parameter set to be used to select or to specify "corner cases" of, for example training data useful during verification of a computer vision model 16.

In an alternative example, the first visual parameter set is automatically modified based on the outcome of the sensitivity analysis according to the computer implemented method of the first aspect to ensure that visual data is obtained that is compliant with the definition of the second visual parameter set, causes a small variance in performance score when applied to the computer vision model 16. This enables the second visual parameter set to be used to select or to specify "steady state cases" as an example of low variance performance of the computer vision model 16.

A skilled person will appreciate that a "large" or "small" variance in performance score are defined relative to the application, visual parameter set, and scene under consideration. The performance score of the computer vision model 16 for a specific item of input visual data may be computed using at least one of a confusion matrix, a precision score, a recall score, an F1 score, a union intersection score, or a mean average score, with a "large" or "small" variance having different values dependent on which technique is applied.

Many different types of modification to the first visual parameter set can be made. For example, at least one element of a visual parameter set can be deleted, increased, decreased, or added. In Box 2, the "cloudiness" and "precipitation parameters have been reduced in upper scope to 85 down from 100, and the "sun altitude angle" parameter has been reduced in scope by removal of its final element. The "precipitation" parameter has been upsampled with the addition of two additional elements. The entire "cam yaw" parameter has been deleted. The foregoing is a specific example of how the visual parameter set is automatically altered and many variations are possible.

---

Box 2-example of a second visual parameter set

---

```
worldmodel = OrderedDict ([ ('spawn point', [0,3,6,9,12,15]),
   ('cam_yaw', [-20, -10, 0, 10, 20]),
   ('cam_pitch', [-10, -5, 0, 5, 10]),
   ('cam_roll', [-10, -5, 0, 5, 10]),
   ('cloudyness', [0, 33, 66, 85 100 ]),
   ('precipitation', [0, 50, 70, 75, 80, 85, 100]),
   ('precipitation_deposits', [0, 50, 100]),
   ('sun_altitude_angle', [-10, 0, 33, 66, 100]),
   ('sun_azimuth_angle', [0, 45, 90, 135, 180, 225, 270]),
])
```

---

Figure 2:
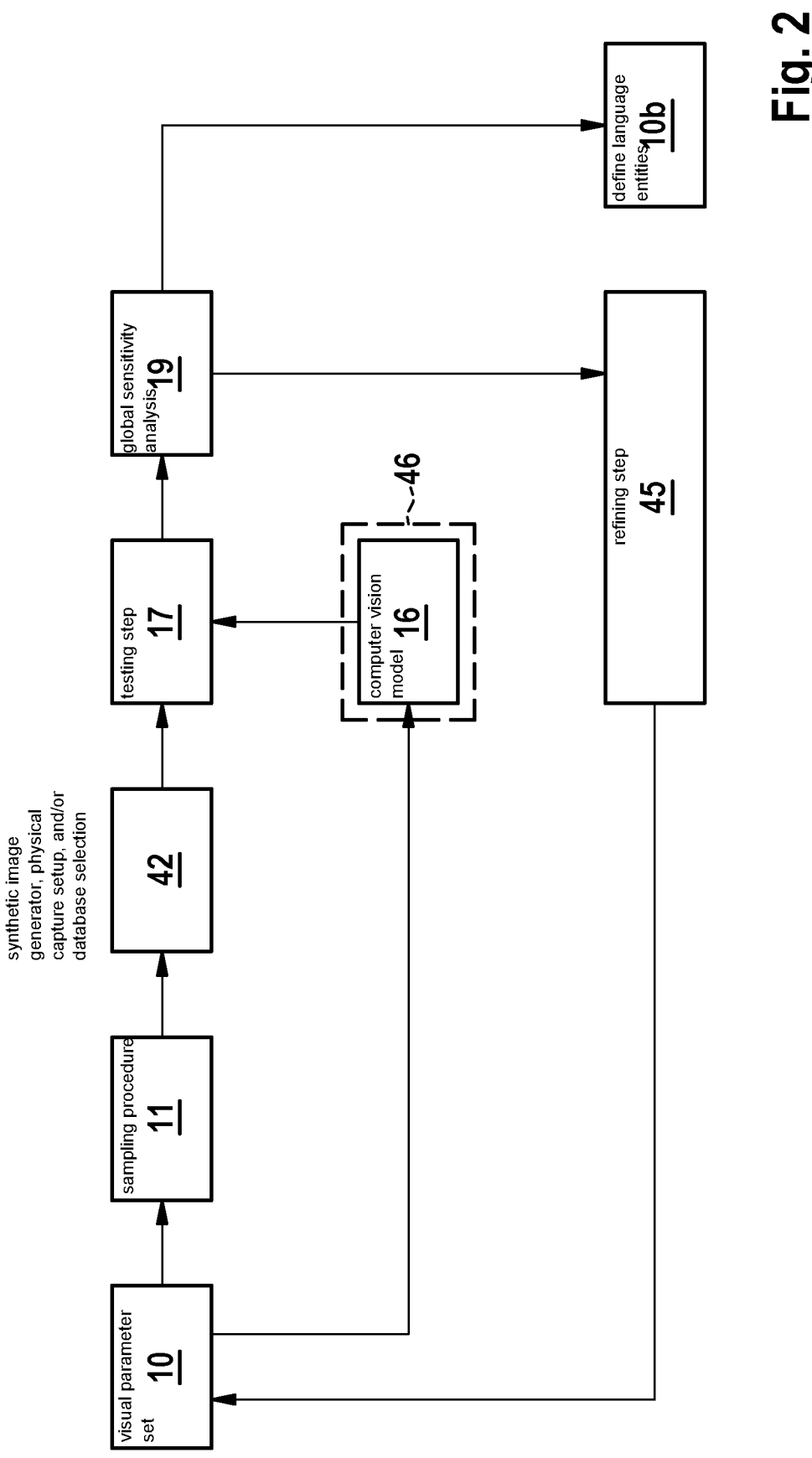
FIG. 2 schematically illustrates an example of an exemplary implementation of the first aspect for generating a data structure comprising language entities for a semantic mapping, in accordance with the present invention.

FIG. 2 schematically illustrates an example of an automatic implementation of the first aspect for generating a data structure comprising language entities for a semantic mapping. A detailed description of an operation example of the method according to the first aspect is now provided.

As an example, a set of initial visual parameters and values or value ranges for the visual parameters in a given scenario can be defined (e.g. by experts). A simple scenario would have a first parameter defining various sun elevations relative to the direction of travel of the ego vehicle, although, as will be discussed later, a much wider range of visual parameters is possible.

A sampling procedure 11 generates a set of assignments of values to the visual parameter set 10 (world model, ODD). Optionally, the parameter space defined by the visual parameter set is randomly sampled according to a Gaussian distribution. Optionally, the visual parameters are oversampled at regions that are suspected to define performance corners of the computer vision model 16. Optionally, the visual parameters are under sampled at regions that are suspected to define predictable performance of the computer vision model 16. Accordingly, in an embodiment, providing a visual data set compliant with the first visual parameter set further comprises sampling the at least one initial visual parameter set comprised in the first visual parameter set to obtain a set of sampled initial visual parameter values, and obtaining the visual data set of initial visual parameter values using the set of sampled initial visual parameter values.

The next task is to acquire images in accordance with the visual parameter set.

A synthetic image generator, a physical capture setup and/or database selection 42 can be implemented allowing the generation, capture or selection of images and corresponding items of groundtruth according to the visual parameters sampled during the sampling procedure 11.

Synthetic images are generated, for example, using the CARLA generator discussed previously. In the case of synthetic generation the groundtruth may be taken to be the sampled value of the visual parameter set used to generate the given synthetic image.

The physical capture setup enables an experiment to be performed to obtain a plurality of test visual data within the parameter space specified. Alternatively, databases containing historical visual data archives that have been appropriately labelled may be selected.

In a testing step 17, images from the image acquisition step 42 are provided to a computer vision model 16. Optionally, the computer vision model is comprised within an autonomous vehicle or robotic system 46 as an example of a "hardware in the loop" test.

For each item of visual data input into the computer vision model 16, a predicted item of output data is obtained from the computer vision model 16. This represents a prediction of an element of a scene represented in the item of visual data input into the computer vision model 16. A performance score based, for example, on a comparison between the groundtruth and the predicted item of output data is calculated. The result is a plurality of performance scores according to the sampled values of the visual parameter set.

Accordingly, in an embodiment, obtaining a plurality of performance scores further comprises generating, using the computer vision model, a plurality of predictions of elements of observed scenes in the subset of items of visual data, wherein the plurality of predictions comprise at least one prediction of a classification label and/or at least one regression value of at least one item in the subset of visual data, and comparing the plurality of predictions of elements in the subset of items of visual data with the corresponding subset of groundtruth data, to thus obtain the plurality of performance scores.

In an embodiment, the performance score comprises, or is based on, any one or combination, of the list of a confusion matrix, a precision score, a recall score, an F1 score, a union intersection score, or a mean average score; and/or wherein the computer vision model is a neural network, or a neural-network-like model.

A (global) sensitivity analysis 19 is performed on the performance scores with respect to the visual parameters 10. The (global) sensitivity analysis 19 determines the relevance of visual parameters of the visual parameter set to the performance of the computer vision model 16.

As an example, for each visual parameter, a variance of performance scores is determined. Such variances are used to generate and/or display a ranking of visual parameters. This information can be used to modify the set of initial visual parameters 10 of the visual parameter set.

Accordingly, in an embodiment, performing the sensitivity analysis further comprises computing a plurality of variances of respective performance scores of the plurality of performance scores with respect to the initial visual parameters of the first visual parameter set and/or with respect to one or more combinations of visual parameters of the first visual parameter set; and, optionally, ranking the initial visual parameters of the first visual parameter set and/or the one or more combinations of visual parameters based on the computed plurality of variances of performance scores.

Optionally, clusters of conditions may be generated according to the (global) sensitivity analysis 19. For example, if a first Boolean visual parameter "the camera is looking towards the sun" and a second Boolean visual parameter "the road is wet" are asserted, then the performance of the computer vision model 16 may be low, and the first and second visual parameters both receive a high ranking.

The testing step 17 and the (global) sensitivity analysis 19 and/or retraining the computer vision model 16 can be repeated. Optionally, the performance scores and variances of the performance score are tracked during such training iterations. The training iterations are stopped when the variances of the performance score appear to have settled (stopped changing significantly). Optionally, irrelevant visual parameters may be iteratively modified or removed from subsequent versions of the visual parameter set. Optionally, tests of higher resolution may be applied to parts of the visual parameter set considered to be important for the performance of the function 16.

A refining step 45 uses the results of the (global) sensitivity analysis 19 to modify at least one initial visual parameter of the visual parameter set, to thus yield a second visual parameter set. When the second visual parameter set is sampled 11 and visual data is obtained 42, a plurality of the items of visual data obtained according to the second visual parameter set have an improved performance score.

As an example, a visual parameter with performance scores having a lower variance may be removed from the set of visual parameters. Alternatively, another set of visual parameters may be added if performance scores improve above a threshold. A range of at least one visual parameter may be enlarged or reduced. Many different types of modification to the first visual parameter set may be performed.

Accordingly, an embodiment further comprises identifying, based on an identification condition, at least one initial visual parameter set (e.g. comprising one or more discrete points or at least one continuous range of points) of the first visual parameter set using the plurality of performance scores and/or the plurality of variance of performance scores, and wherein generating the second visual parameter set comprises modifying the at least one initial visual parameter set by dividing the at least one initial visual parameter set into at least a first and a second visual parameter subset, thus defining two further language entities.

Accordingly, an embodiment further comprises concatenating at least a third and a fourth visual parameter set of the first visual parameter set into a combined visual parameter subset.

Accordingly, an embodiment further comprises at least one range of the initial visual parameter of the first visual parameter set using the plurality of performance scores and/or the plurality of variances of performance scores, and generating the second visual parameter set comprises modifying the range of the at least one initial visual parameter by enlarging or shrinking the scope of the at least one initial visual parameter range on its domain to thus yield a modified visual parameter range.

Accordingly, an embodiment further comprises identifying at least one initial visual parameter set of the first visual parameter set using the plurality of performance scores and/or the plurality of variances of performance scores, and generating the second visual parameter specification comprises modifying the at least one initial visual parameter set by splitting or combining ranges (or sets) of the at least one initial visual parameter set to thus yield a modified visual parameter set.

In an example, the visual parameter range of one or more parameters is modified to increase the performance variance.

In an example, the visual parameter range of one or more parameters is modified to decrease the performance variance.

As an example, the sun altitude angle ("sun_altitude", [-10, 0, 33, 66, 100]) may be partitioned or split into ('night', [True, False]) corresponding to ('sun_altitude'<=10), ('sun_set_rise', [True, False]) corresponding to ('sun_altitude', [10,33]), ('day_sun', [33,66,100]). It is in such splitting or combining of visual parameters that it is possible for a user to focus on a model having higher variance, in which case corner cases can be tested more easily, or lower variance, in which case "normal operation" can be tested more reliably. Either way, the number of computational cycles needed for convergence can be reduced.

Accordingly, an embodiment further comprises identifying at least one combination of visual parameters comprising at least two initial visual parameter sets or at least two initial visual parameter ranges or at least one initial visual parameter set and one initial visual parameter range from the first visual parameter set using the plurality of performance scores and/or the plurality of variance of performance scores, and generating the second visual parameter set comprises concatenating the at least one combination of initial visual parameters, thus defining a further language entity.

Accordingly, an embodiment further comprises identifying the at least one combination of visual parameters is automated according to at least one predetermined criterion based on the corresponding variances of performance scores, optionally wherein the at least one combination of visual parameters is identified, if the corresponding variance of performance scores exceeds a predetermined threshold value.

In an embodiment, providing a semantic mapping from visual parameters of the second visual parameter set to items of visual data and corresponding items of groundtruth data comprises:

sampling the at least one initial visual parameter comprised in the first visual parameter set to obtain a set of sampled initial visual parameter values, optionally wherein the sampling of the at least one initial visual parameter range is performed using a sampling method optionally including combinatorial testing and/or Latin hypercube sampling; and obtaining a visual data set by one or a combination of:

generating, using a synthetic visual data generator, a synthetic visual data set comprising synthetic visual data and groundtruth data synthesized according to the samples of the second visual parameter set; and/or sampling items of visual data from a database comprising specimen images associated with corresponding items of groundtruth data according to the samples of the second visual parameter set; and/or specifying experimental requirements according to the samples of the second visual parameter set, and performing live experiments to obtain the visual data set and to gather groundtruth data.

Accordingly, an embodiment comprises outputting the set of visual data and corresponding items of groundtruth data as a training data set.

In an embodiment, the at least one data structure comprising at least one language entity based on the visual parameters of the second visual parameter set is received via an input interface of a computing device.

In an embodiment, the language entity is displayed to a user via an output interface of the computing device.

Generally, different sets of visual parameters (defining the world model or ontology) for testing or statistically evaluating the computer vision model 16 can be defined and their implementation or exact interpretation may vary. This methodology enforces decision making based on empirical results 19, rather than experts' opinion alone and it enforces concretization 42 of abstract parameters 10. Experts can still provide visual parameters as candidates 10.

Visual parameters of the refined visual parameter set are used in 10b to define language entities of the specification language. If, for example, a one of the refined visual parameters is a Boolean value indicating whether or not "sun_altitude" is greater than 33°, a data structure comprising at least one language entity can be generated. In fact, in this case one would arrive at language entities "sun_altitude", "33°", and ">", which can be combined in a phrase such as "sun_altitude>33°". Such a phrase can be a representation encoding the data structure. It may be essential to consider one or more combinations of refined visual parameters. As an example, a combination of particular ranges of visual parameters "sun_altitude" and "precipitation" (see FIG. 5C) may be relevant. Such a combination can be promoted to become a new Boolean visual parameter and, hence, a new (molecular) language entity "sun_altitude & precipitation". Alternatively, operators such as "and", "or", "if . . . , then . . . " or "for all . . . " or many more from imperative and/or functional programming can be added as another kind of language entities. In the aforementioned example, this could give rise to a phrase like "sun_altitude>10° and sun_altitude<=45° and precipitation=2".

The decomposition of the sampling 11 and obtaining 42 items of visual data and items of corresponding groundtruth data generates a semantic mapping from visual parameters of the refined (i.e. the second visual parameter set) to concrete images and corresponding groundtruth. The semantic mapping defines a semantics in that language entities or phrases built from language entities are mapped to images and groundtruth. In other words, the semantic mapping makes (refined) visual parameters interpretable.

The semantic mapping is not surjective. In fact, there may exist many or even infinitely many items of visual data and items of corresponding groundtruth being described in terms of identical (refined) visual parameters. It is difficult to develop and test a computer vision model on all of these. However, the method of the first aspect provides means to find the most relevant (refined) language entities for computer vision model. While for each relevant language entity, there are still infinitely many items of visual data and corresponding groundtruth, the best one can do is to define meaningful representatives. It is this semantic mapping that can be thought of as providing such representatives of equivalence classes.

A second aspect relates a computer-implemented method 200 for training a computer vision model, comprising:

obtaining a further computer vision model configured to perform a computer vision function of characterising elements of observed scenes; and obtaining a set of training data according to the method of the first aspect, or its embodiments.

training the computer vision model using the set of training data. In so doing, the specification language provides a means to describe how the computer vision model has been trained. Such is important in terms of comparability and liability. In fact, when it comes to evaluating at least two different computer vision models 16, it is advantageous, if the at least two different computer vision models be trained in much the same way according to the second aspect, in particular, using the same specification language and the same operational design domain (formulated in the specification language).

Figure 3:
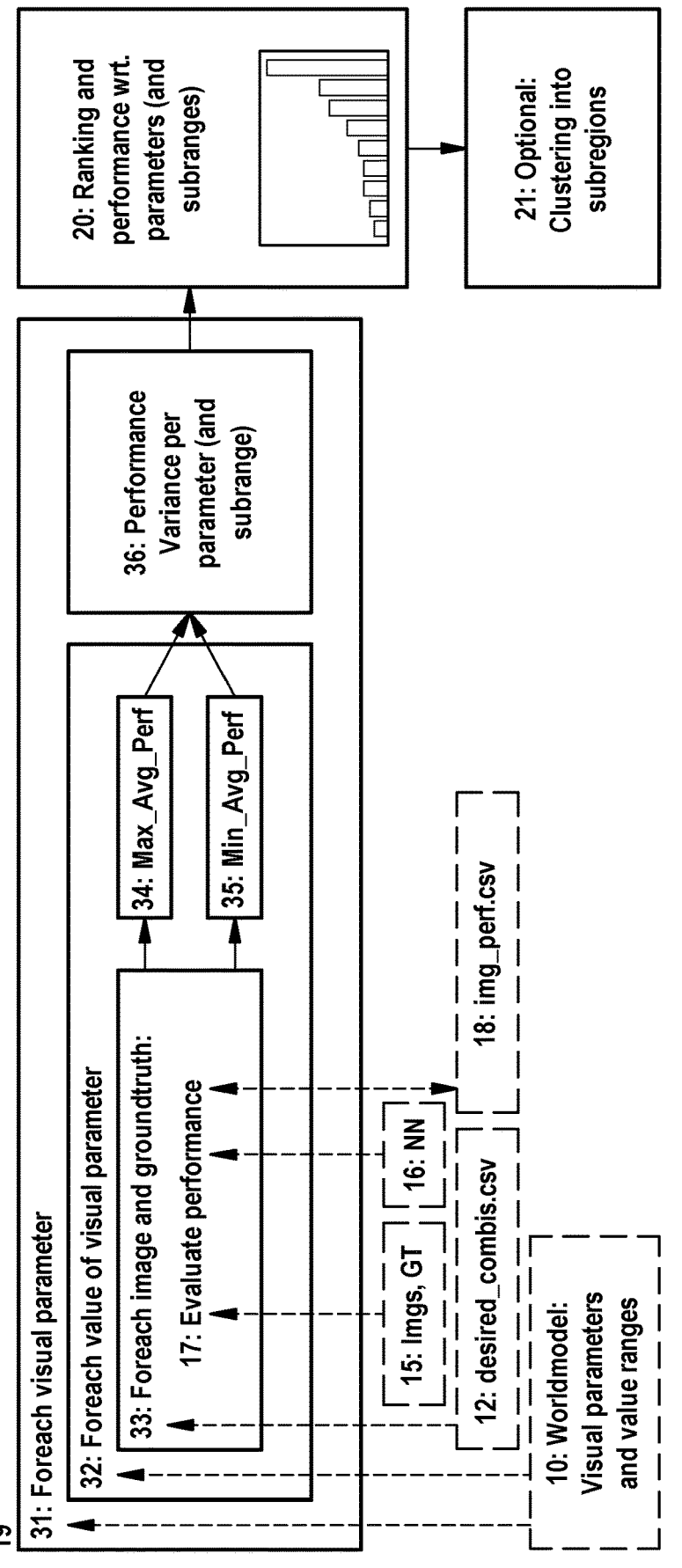
FIG. 3 schematically illustrates an example of a sensitivity analysis function, in accordance with the present invention.

FIG. 3 schematically illustrates an example of a sensitivity analysis function 19.

In general, sensitivity analysis (or, more narrower, global sensitivity analysis) can be seen as the numeric quantification of how the uncertainty in the output of a model or system can be divided and allocated to different sources of uncertainty in its inputs. This quantification can be referred to as sensitivity, or robustness. In the context of this specification, the model can, for instance, be taken to be the mapping, $$\Phi: X \to Y$$

from visual parameters (or visual parameter coordinates) $X_i$, i=1, . . . , n based on which items of visual data have been captured/generated/selected to yield performance scores (or performance score coordinates) $Y_j$, j=1, . . . , m based on the predictions and corresponding groundtruth. If m is equal to one, there is only one performance score. However, m can be greater than one.

A variance-based sensitivity analysis, sometimes also referred to as the Sobol method or Sobol indices is a particular kind of (global) sensitivity analysis. To this end, samples of both input and output of the aforementioned mapping $\Phi$ can be interpreted in a probabilistic sense. In fact, as an example a (multi-variate) empirical distribution for input samples can be generated. Analogously, for output samples a (multi-variate) empirical distribution can be computed. A variance of the input and/or output (viz. of the performance scores) can thus be computed. Variance-based sensitivity analysis is capable of decomposing the variance of the output into fractions which can be attributed to input coordinates or sets of input coordinates. For example, in case of two visual parameters (i.e. n=2), one might find that 50% of the variance of the performance scores is caused by (the variance in) the first visual parameter ($X_1$), 20% by (the variance in) the second visual parameter ($X_2$), and 30% due to interactions between the first visual parameter and the second visual parameter. For n>2 interactions arise for more than two visual parameters. Note that if such interaction turns out to be significant, a combination between two or more visual parameters can be promoted to become a new visual dimension and/or a language entity. Variance-based sensitivity analysis is an example of a global sensitivity analysis.

Hence, when applied in the context of this specification, an important result of the variance-based sensitivity analysis is a variance of performance scores for each visual parameter. The larger a variance of performance scores for a given visual parameter, the more performance scores vary for this visual parameter. This indicates that the computer vision model is more unpredictable based on the setting of this visual parameter. Unpredictability when training the computer vision model 16 may be undesirable, and thus visual parameters leading to a high variance can be de-emphasized or removed when generating a data structure comprising a plurality of language entities defining a semantic mapping of visual parameters to a visual parameter space.

In the context of this specification, the model can, for instance, be taken to be the mapping from visual parameters based on which items of visual data have been captured/generated/selected to yield performance scores based on a comparison between the predictions and the groundtruth. An important result of the sensitivity analysis can be a variance of performance scores for each visual parameter. The larger a variance of performance scores for a given visual parameter, the more performance scores vary for this visual parameter. This indicates that the computer vision model is more unpredictable based on the setting of this visual parameter.

The example of the sensitivity analysis function 19 of FIG. 3 operates on the predications of scenes output from the computer vision model 16 in combination with the groundtruth 15. The performance 17 of the computer vision model 16 is evaluated for corresponding pairs of images and groundtruth, yielding a maximum average performance 34 and a minimum average performance 35 for each corresponding pair of prediction and ground truth.

Optionally, at least one of either the maximum average performance 34 and a minimum average performance 35 are evaluated each corresponding pair of prediction and ground truth provided using the same visual parameter 32, or both of the maximum average performance 34 and a minimum average performance 35. This enables a performance variance per parameter (and subbranch) 36 to be calculated. The sensitivity analysis function 19 is iterated over a plurality of visual parameters in the first visual parameter set.

It is not essential that the sensitivity analysis function 19 is iterated over every visual parameter in the first visual parameter set. Accordingly, a performance variance per parameter 36 (and optionally subrange) is calculated for a plurality of parameters in the first visual parameter set.

The performance variance per parameter 36 enables a ranking of performance with respect to parameters (and sub-ranges) to be performed in a ranking unit 20. Optionally, multiple parameters may affect the performance of the computer vision model 16, and these may be clustered into subregions.

Figure 4:
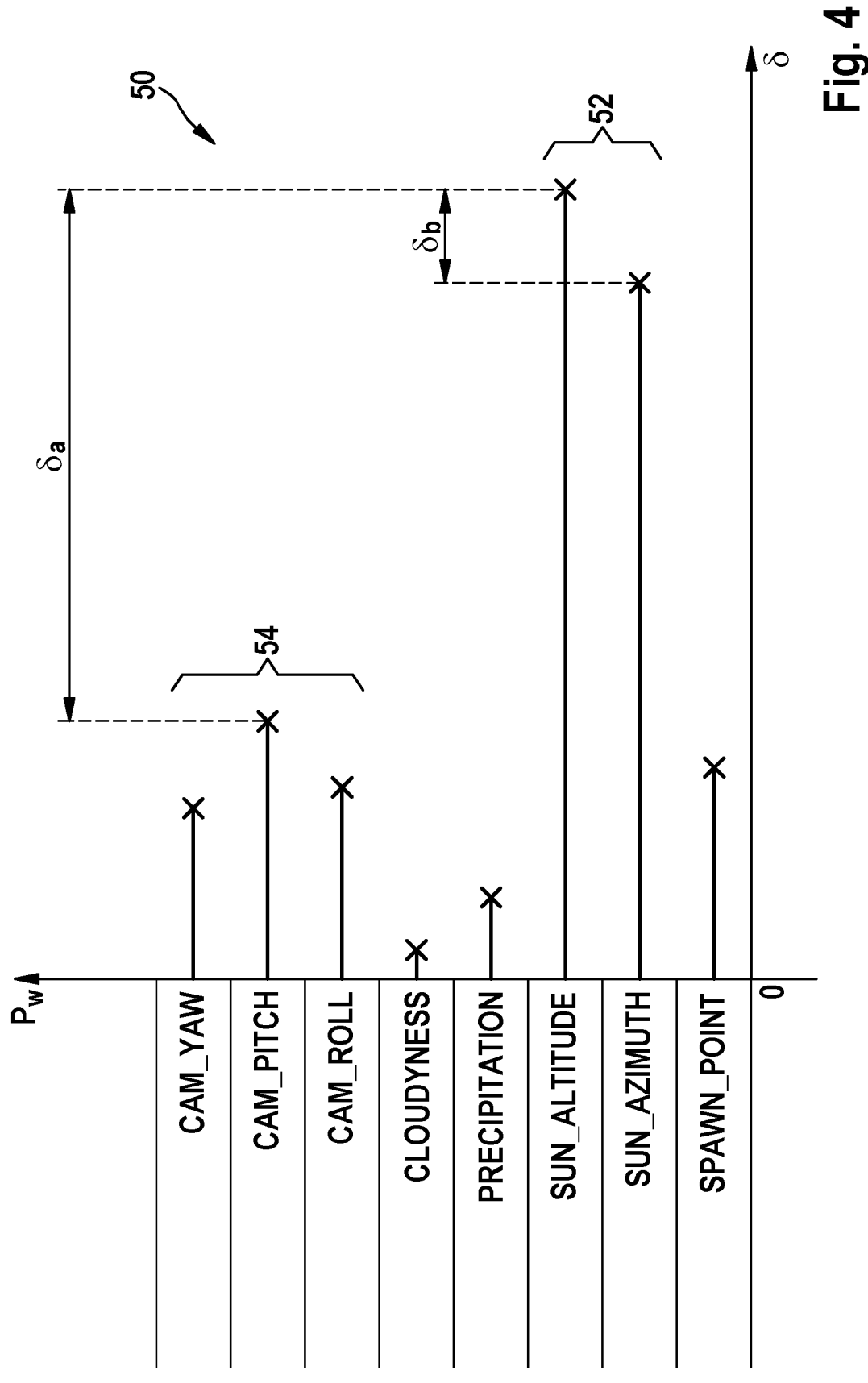
FIG. 4 schematically illustrates an example of clustering visual parameter sets, in accordance with the present invention.

FIG. 4 schematically illustrates an example of clustering visual parameter sets.

In FIG. 4, the X-axis of the graph 50 represents a sensitivity of the performance of a computer vision model 16 to a given parameter. The Y-axis enumerates visual parameters of the visual parameter set shown in Box 1 above.

The visual parameters "sun_altitude" and "sun_azimuth" form a first visual parameter cluster 52. The visual parameters "cam_yaw", "cam_pitch", "cam_roll" form a second visual parameter cluster 54. The clusters are identifiable because the sensitivity scores of each visual parameter in the first and second cluster meet an identification condition.

An identification condition is that a difference $\delta_b$ of the magnitude of the two performance scores of "sun_altitude" and "sun_azimuth" is small compared to the prominence of the "sun_altitude" performance score relative to the next largest cluster 54 as measured by distance $\delta_a$. This, therefore, constitutes an identification condition enabling the computer implemented method to group the visual parameters "sun_altitude" and "sun_azimuth" as a first cluster in the second visual parameter set.

Figure 5A:
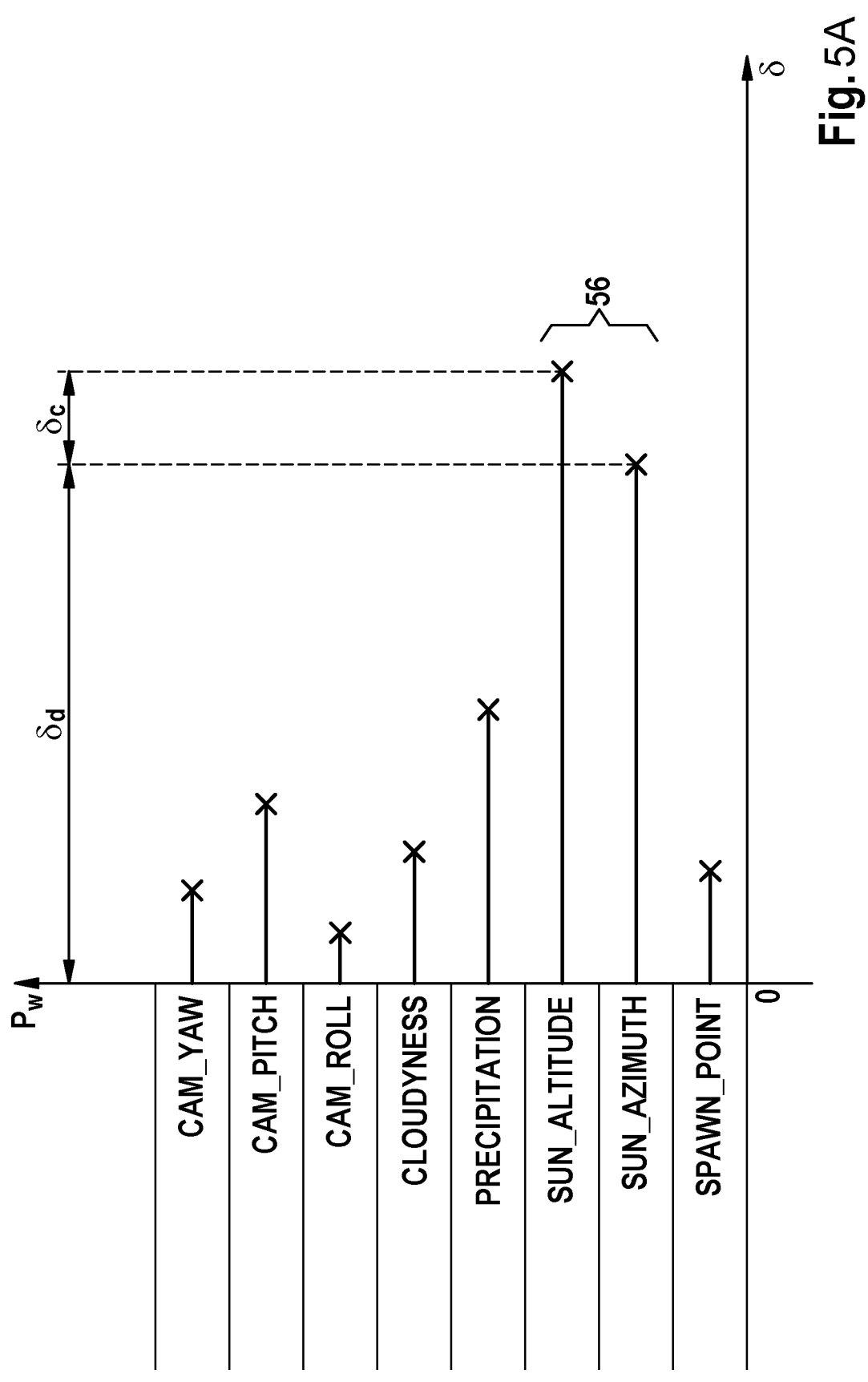
FIGS. 5A and 5B schematically illustrates an example of subdividing parameter ranges, in accordance with the present invention.
Figure 5B:
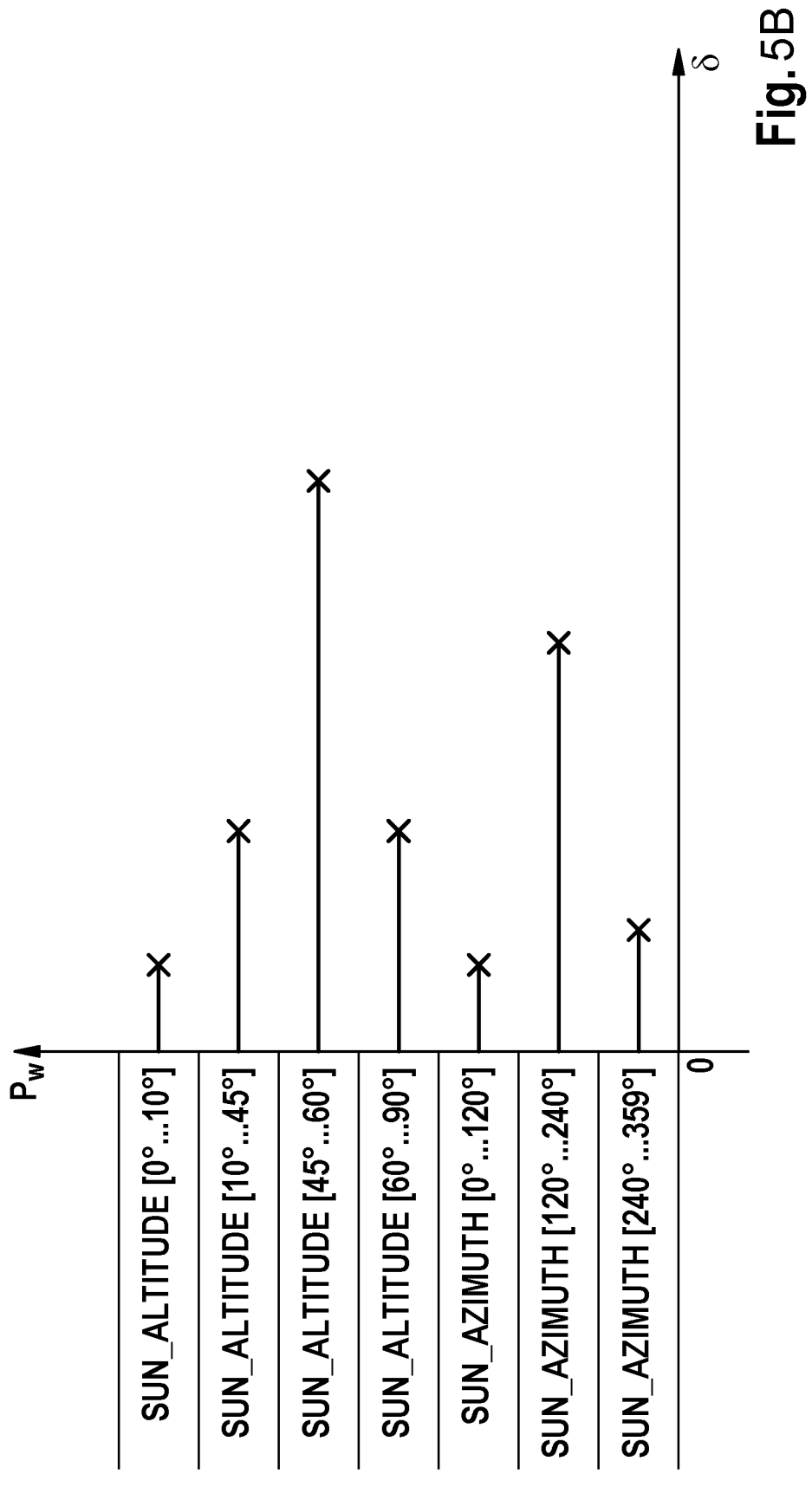

FIGS. 5A and 5B schematically illustrate an example of subdividing parameter ranges.

FIG. 5A schematically illustrates a plurality of performance scores resulting from a first visual parameter set prior to subdivision. The identification condition can be evaluated by assessing the ratio of $\delta_c/(\delta_c+\delta_d)$. If the ratio is below an identification threshold for a given subset of the visual parameters, then this subset of the visual parameters is a candidate for decomposition.

As shown in FIG. 5A, the subset of visual parameters "sun_altitude" and "sun_azimuth" appear to have a considerably larger effect on the sensitivity of the performance of the computer vision model 16 than any of the other visual parameters.

FIG. 5B schematically illustrates an example of subdivided parameter ranges. In this case, the "sun_altitude" and "sun_azimuth" have been automatically subdivided into four and three sub-ranges, respectively. Metadata accompanying the visual parameters state that the domain of the "sun_altitude" visual parameter is between 0° and 90°. Metadata accompanying the visual parameters state that the domain of the "sun_azimuth" visual parameter is between 0° and 359°. Accordingly, the method calculates appropriate subdivisions of the parameter ranges.

Optionally, a user may input a suggestion for subdividing into sub-ranges via a graphical user interface. Optionally, a proposed subdivision may be automatically proposed to a user via a graphical user interface, with the proposed subdivision being applied to the second visual parameter set upon user agreement.

In an example, once the subdivisions of the parameter ranges have been calculated, the corpus of predictions output from the computer vision model 16 in combination with the original items of visual data (image) and their groundtruth 15 that were previously calculated are resampled according to the subdivided visual parameter ranges. Therefore, the subdivided visual parameter ranges return more detail about the sensitivity of sub-ranges of the visual parameter set.

Optionally, the subdivided visual parameter ranges are incorporated into the second visual parameter set.

Accordingly, an embodiment further comprises identifying, based on an identification condition, at least one initial visual parameter set of the first visual parameter set using the plurality of performance scores. Generating the second visual parameter set comprises modifying the at least one initial visual parameter set by dividing the at least one initial visual parameter set into at least a first and a second modified visual parameter set, or combining a first and a second visual parameter into a cluster.

A specific embodiment of the first aspect concerns the step of sampling the first visual parameter set.

The sampling of the at least one initial visual parameter set is performed using a sampling method. Optionally, the sampling method includes combinatorial testing, and/or Latin hypercube sampling. One example of the implementation of a pairwise sampling function for implementing combinatorial sampling over the visual parameters of the visual parameter set is given in Box 3.

---

Box 3-example "Python" code implementing a pairwise
sampling function 11 of the first visual parameter set

---

```
# The sampling algorithm corresponds to (11)
#wmPairs = { k: [ ] for k in worldmodel.keys( ) }
df = DataFrame(columns=worldmodel.keys( ) )
#Ensure that projection on each dimension still
guarantees pair-wise coverage on the subspace
    for dim in worldmodel.keys( ) :
        for dim_val in worldmodel[dim] :
            wm_subspace = worldmodel.copy( )
            wm_subspace[dim] = [dim_val]
            for row in AllPairs(wm_subspace.values ( ) ) :
                df.loc[len(df)] = row
    df.drop_duplicates( )
    #The output is df and corresponds to (12) desired_combis.csv
```

---

Figure 5C:
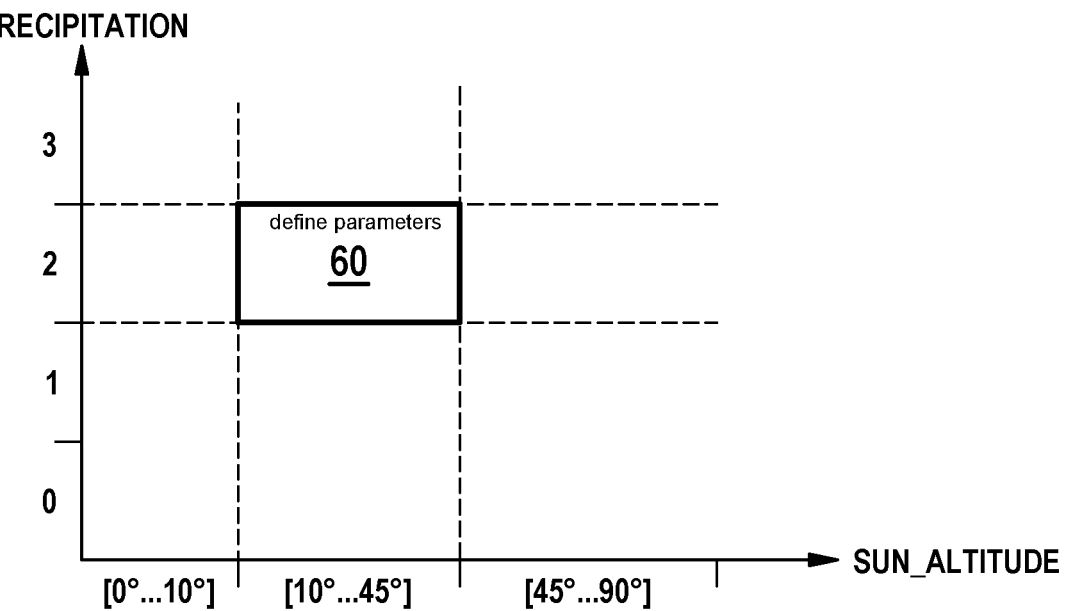
FIG. 5C schematically illustrates an example of combining two parameter ranges of visual parameters, in accordance with the present invention.

FIG. 5C schematically illustrate an example of combining two parameter ranges of visual parameters. In the hypothetical case that "sun_altitude>10° and sun_altitude<=45° and precipitation=2" is challenging for computer vision (e.g. because of glare), it may make sense to promote this combination to a new visual parameter and thus language entity "sun_altitude>10° and sun_altitude<=45° and precipitation=2".

Advantageously, such a sampling technique enables a good coverage of the overall parameter space, with an efficient number of computations. In particular, a brute-force sampling of the parameter space is not required. Accordingly, the technique of the present specification firstly enables a large parameter space to be sampled using, for example, combinatorial testing to enable the performance of a sensitivity analysis.

The outcome of a sensitivity analysis is a first reduction in search space complexity by providing a second visual parameter set having visual parameters that are most relevant to the performance of the computer vision model. Then, in an optional verification step 47, the second visual parameter set may again be sampled according to a technique such as combinatorial testing, to enable a further reduction in the search space and an improvement in efficiency when verifying the second visual parameter set.

In an embodiment, there is provided displaying, via a graphical user interface displayed on output interface, a graphical representation of the second visual parameter set to a user, optionally in combination with a graphical representation of the first visual parameter set, and optionally in combination with a graphical representation of the outcome of the sensitivity analysis.

In an embodiment, there is provided generating a third visual parameter set as a consequence of an interactive user amendment to the graphical representation of the second visual parameter set via the graphical user interface.

A third aspect provides an apparatus 300 for generating a data structure comprising a plurality of language entities defining a semantic mapping of visual parameters to a visual parameter space, comprising an input interface 310, a processor 320, a memory 330, and an output interface 340.

The input interface 310 is configured to obtain a computer vision model configured to perform a computer vision function of characterizing elements of observed scenes, and to obtain a first visual parameter set comprising a plurality of initial visual parameters. An item of visual data provided based on the extent of the at least one initial visual parameter is capable of affecting a classification or regression performance of the computer vision model.

The processor 320 is configured to providing a visual data set comprising a subset of items of visual data compliant with the first visual parameter set, and a corresponding subset of items of groundtruth data, and to apply the subset of items of visual data to the computer vision model to obtain a plurality of performance scores characterizing the performance of the computer vision model when applied to the subset of items of visual data of the visual data set, using the corresponding groundtruth data, and to perform a sensitivity analysis of the plurality of performance scores over a domain of the first visual parameter set, and to generate a second visual parameter set comprising at least one updated visual parameter, wherein the second visual parameter set comprises at least one initial visual parameter modified based on the outcome of the sensitivity analysis to provide the at least one updated visual parameter, and to generate a data structure comprising at least one language entity based on the visual parameters of the second visual parameter set, thus providing a semantic mapping to visual parameters of the second visual parameter set.

Figure 6:
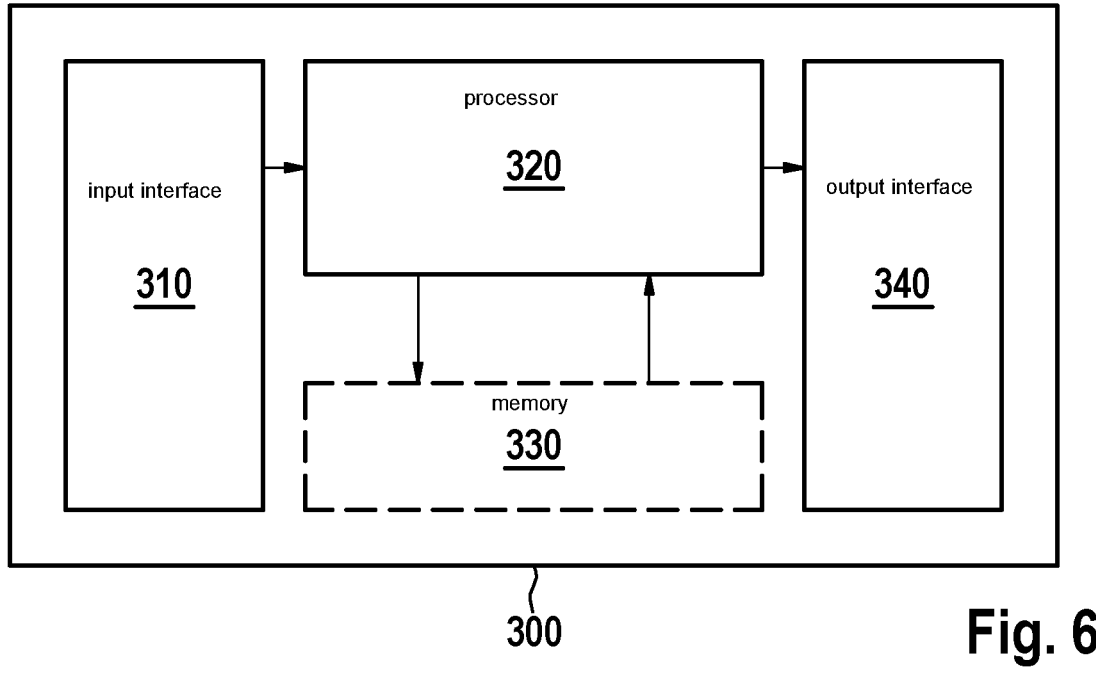
FIG. 6 schematically illustrates an example apparatus according to the third aspect of the present invention.

FIG. 6 schematically illustrates an apparatus 300 according to the third aspect.

In an example, the data processing apparatus 300 is a personal computer, server, cloud-based server, or embedded computer. It is not essential that the processing occurs on one physical processor. For example, it can divide the processing task across a plurality of processor cores on the same processor, or across a plurality of different processors, or virtual machines. The processor may be a Hadoop™ cluster, or provided on a commercial cloud processing service. A portion of the processing may be performed on non-conventional processing hardware such as a field programmable gate array (FPGA), an application specific integrated circuit (ASIC), one or a plurality of graphics processors, application-specific processors for machine learning, and the like.

The memory 330 of the apparatus 300 stores a computer program 350 according to the fourth aspect that, when executed by the processor 320, causes the processor 320 to execute the functionalities described by the computer-implemented methods according to the first and second aspects. According to an example, the input interface 310 and/or output interface 340 is one of a USB interface, an Ethernet interface, a WLAN interface, or other suitable hardware capable of enabling the input and output of data samples from the apparatus 300. In an example, the apparatus 300 further comprises a volatile and/or non-volatile memory system 330 configured to receive input observations as input data from the input interface 310.

In an example, the apparatus 300 is an automotive embedded computer comprised in a vehicle, in which case the automotive embedded computer may be connected to sensors and actuators present in the vehicle. For example, the input interface of the apparatus may interface with one or more of an engine control unit providing velocity, fuel consumption data, battery data, location data and the like. For example, the output interface 340 of the apparatus 300 may interface with one or more of a plurality of brake actuators, throttle actuators, fuel mixture or fuel air mixture actuators, a turbocharger controller, a battery management system, the car lighting system or entertainment system, and the like.

A fourth aspect provides computer program 350 comprising machine-readable instructions which, when executed by a processor, is capable of carrying out either (i) the computer-implemented method 100 of the first aspect, or its embodiments, and/or (ii) the computer-implemented method 200 of the second aspect.

A fifth aspect provides a computer readable medium 370 comprising at least one of the computer programs according to the fourth aspect, and/or the data structure comprising the at least one language entity and/or the semantic mapping generated according to the method 100 of the first aspect, or its embodiments.

The semantic mapping can be stored in various ways. As an example, the semantic mapping can be stored in terms of a numeric look-up table or in a (optionally relational) database. Containing images and/or videos the semantic mapping usually has a large data size and needs to be stored in a computer-implemented system. It is therefore also possible to encode the semantic mapping by means of another neural network thus yielding a compressed representation of the semantic mapping.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for generating a data structure including a plurality of language entities defining a semantic mapping of visual parameters to a visual parameter space, the method comprising the following steps:

obtaining a computer vision model configured to perform a computer vision function of characterizing elements of observed scenes;

obtaining a first visual parameter set including a plurality of initial visual parameters, wherein an item of visual data provided based on an extent of the at least one initial visual parameter is capable of affecting a classification or regression performance of the computer vision model;

providing a visual data set including a subset of items of visual data compliant with the first visual parameter set, and a corresponding subset of items of groundtruth data;

applying the subset of items of visual data to the computer vision model to obtain a plurality of performance scores characterizing performance of the computer vision model when applied to the subset of items of visual data of the visual data set, using the corresponding groundtruth data;

performing a sensitivity analysis of the plurality of performance scores over a domain of the first visual parameter set;

generating a second visual parameter set including at least one updated visual parameter, wherein the second visual parameter set includes at least one initial visual parameter modified based on the outcome of the sensitivity analysis to provide the at least one updated visual parameter; and generating a data structure including at least one language entity based on the visual parameters of the second visual parameter set, thus providing a semantic mapping to the visual parameters of the second visual parameter set.

2. The computer-implemented method according to claim 1, wherein the obtaining of the plurality of performance scores includes:

generating, using the computer vision model, a plurality of predictions of elements of observed scenes in the subset of items of visual data, wherein the plurality of predictions include at least one prediction of a classification label and/or at least one regression value of at least one item in the subset of visual data;

comparing the plurality of predictions of elements in the subset of items of visual data with the corresponding subset of groundtruth data, to obtain the plurality of performance scores.

3. The computer-implemented method according to claim 2, wherein the performance score comprises, or is based on, any one or combination, of: a list of a confusion matrix, a precision score, a recall score, an F1 score, a union intersection score, a mean average score.

4. The computer-implemented method according to claim 2, wherein the computer vision model is a neural network, or a neural-network-like model.

5. The computer-implemented method according to claim 1, wherein the performing of the sensitivity analysis includes:

computing a plurality of variances of respective performance scores of the plurality of performance scores with respect to the initial visual parameters of the first visual parameter set and/or with respect to one or more combinations of visual parameters of the first visual parameter set.

6. The computer-implemented method according to claim 5, wherein the performing of the sensitivity analysis further includes ranking the initial visual parameters of the first visual parameter set and/or the one or more combinations of visual parameters based on the computed plurality of variances of performance scores.

7. The computer-implemented method according to claim 5, further comprising:

identifying at least one range of the initial visual parameter of the first visual parameter set using the plurality of performance scores and/or the plurality of variances of performance scores, wherein the generating of the second visual parameter set includes modifying the range of the at least one initial visual parameter by enlarging or shrinking a scope of the at least one initial visual parameter range on its domain to thus yield a modified visual parameter range.

8. The computer-implemented method according to claim 5, further comprising:

identifying at least one combination of visual parameters including at least two initial visual parameter sets or at least two initial visual parameter ranges or at least one initial visual parameter set and one initial visual parameter range from the first visual parameter set using the plurality of performance scores and/or the plurality of variances of performance scores, and wherein the generating of the second visual parameter set includes concatenating the at least one combination of initial visual parameters, thus defining a further language entity.

9. The computer-implemented method according to claim 8, wherein the identifying of the at least one combination of visual parameters is automated according to at least one predetermined criterion based a plurality of variances of performance scores.

10. The computer-implemented method according to claim 9, wherein the at least one combination of visual parameters is identified, when the corresponding variance of performance scores exceeds a predetermined threshold value.

11. The computer-implemented method according to claim 1, further comprising:

identifying, based on an identification condition, at least one initial visual parameter set of the first visual parameter set using the plurality of performance scores and/or the plurality of variance of performance scores, and wherein generating the second visual parameter set includes modifying the at least one initial visual parameter set by dividing the at least one initial visual parameter set into at least a first and a second visual parameter subset, thus defining two further language entities;, and/or concatenating at least a third and a fourth visual parameter set of the first visual parameter set into a combined visual parameter subset.

12. The computer-implemented method according to claim 1, wherein the domain of the first visual parameter set includes a subset, in a finite-dimensional vector space, of numerical representations that visual parameters are allowed to lie in, or a multi-dimensional interval of continuous or discrete visual parameters, or a set of numerical representations of visual parameters in the finite-dimensional vector space.

13. The computer-implemented method according to claim 1, wherein the providing of the semantic mapping from visual parameters of the second visual parameter set to items of visual data and corresponding items of groundtruth data includes:

sampling the at least one initial visual parameter included in the first visual parameter set to obtain a set of sampled initial visual parameter values, wherein the sampling of the at least one initial visual parameter range is performed using a sampling method including combinatorial testing and/or Latin hypercube sampling; and obtaining a visual data set by one or a combination of:

generating, using a synthetic visual data generator, a synthetic visual data set including synthetic visual data and groundtruth data synthesized according to the samples of the second visual parameter set; and/or sampling items of visual data from a database including specimen images associated with corresponding items of groundtruth data according to the samples of the second visual parameter set; and/or specifying experimental requirements according to the samples of the second visual parameter set, and performing live experiments to obtain the visual data set and to gather groundtruth data.

14. The computer-implemented method according to claim 13, further comprising outputting the set of visual data and corresponding items of groundtruth data as a training data set.

15. The computer-implemented method according to claim 1, wherein the at least one data structure includes at least one language entity based on the visual parameters of the second visual parameter set is received via an input interface of a computing device, and the language entity is displayed to a user via an output interface of the computing device.

16. A computer-implemented method for training a computer vision model, comprising:

obtaining a further computer vision model configured to perform a computer vision function of characterising elements of observed scenes;

obtaining a set of training data by:

generating a data structure, including:

obtaining a computer vision model configured to perform a computer vision function of characterizing elements of observed scenes;

obtaining a first visual parameter set including a plurality of initial visual parameters, wherein an item of visual data provided based on an extent of the at least one initial visual parameter is capable of affecting a classification or regression performance of the computer vision model;

providing a visual data set including a subset of items of visual data compliant with the first visual parameter set, and a corresponding subset of items of groundtruth data;

applying the subset of items of visual data to the computer vision model to obtain a plurality of performance scores characterizing performance of the computer vision model when applied to the subset of items of visual data of the visual data set, using the corresponding groundtruth data;

performing a sensitivity analysis of the plurality of performance scores over a domain of the first visual parameter set;

generating a second visual parameter set including at least one updated visual parameter, wherein the second visual parameter set includes at least one initial visual parameter modified based on the outcome of the sensitivity analysis to provide the at least one updated visual parameter;

generating the data structure including at least one language entity based on the visual parameters of the second visual parameter set, thus providing a semantic mapping to the visual parameters of the second visual parameter set; and outputting the set of visual data and corresponding items of groundtruth data as the training data set; and training the computer vision model using the set of training data.

17. An apparatus for generating a data structure comprising a plurality of language entities defining a semantic mapping of visual parameters to a visual parameter space, comprising:

an input interface;

a processor;

a memory; and an output interface;

wherein the input interface is configured to obtain a computer vision model configured to perform a computer vision function of characterizing elements of observed scenes, and to obtain a first visual parameter set including a plurality of initial visual parameters, wherein an item of visual data provided based on an extent of the at least one initial visual parameter is capable of affecting a classification or regression performance of the computer vision model, and wherein the processor is configured to:

provide a visual data set including a subset of items of visual data compliant with the first visual parameter set, and a corresponding subset of items of groundtruth data, apply the subset of items of visual data to the computer vision model to obtain a plurality of performance scores characterizing the performance of the computer vision model when applied to the subset of items of visual data of the visual data set, using the corresponding groundtruth data, perform a sensitivity analysis of the plurality of performance scores over a domain of the first visual parameter set, generate a second visual parameter set including at least one updated visual parameter, wherein the second visual parameter set includes at least one initial visual parameter modified based on the outcome of the sensitivity analysis to provide the at least one updated visual parameter, and generate a data structure comprising at least one language entity based on the visual parameters of the second visual parameter set, thus providing a semantic mapping to visual parameters of the second visual parameter set.

18. A non-transitory computer readable medium on which is stored a computer program for generating a data structure including a plurality of language entities defining a semantic mapping of visual parameters to a visual parameter space, the computer program, when executed by a processor, causing the processor to perform the following steps:

obtaining a computer vision model configured to perform a computer vision function of characterizing elements of observed scenes;

obtaining a first visual parameter set including a plurality of initial visual parameters, wherein an item of visual data provided based on an extent of the at least one initial visual parameter is capable of affecting a classification or regression performance of the computer vision model;

providing a visual data set including a subset of items of visual data compliant with the first visual parameter set, and a corresponding subset of items of groundtruth data;

applying the subset of items of visual data to the computer vision model to obtain a plurality of performance scores characterizing performance of the computer vision model when applied to the subset of items of visual data of the visual data set, using the corresponding groundtruth data;

performing a sensitivity analysis of the plurality of performance scores over a domain of the first visual parameter set;

generating a second visual parameter set including at least one updated visual parameter, wherein the second visual parameter set includes at least one initial visual parameter modified based on the outcome of the sensitivity analysis to provide the at least one updated visual parameter; and generating a data structure including at least one language entity based on the visual parameters of the second visual parameter set, thus providing a semantic mapping to the visual parameters of the second visual parameter set.

* * * * *